Patented Mar. 1, 1938

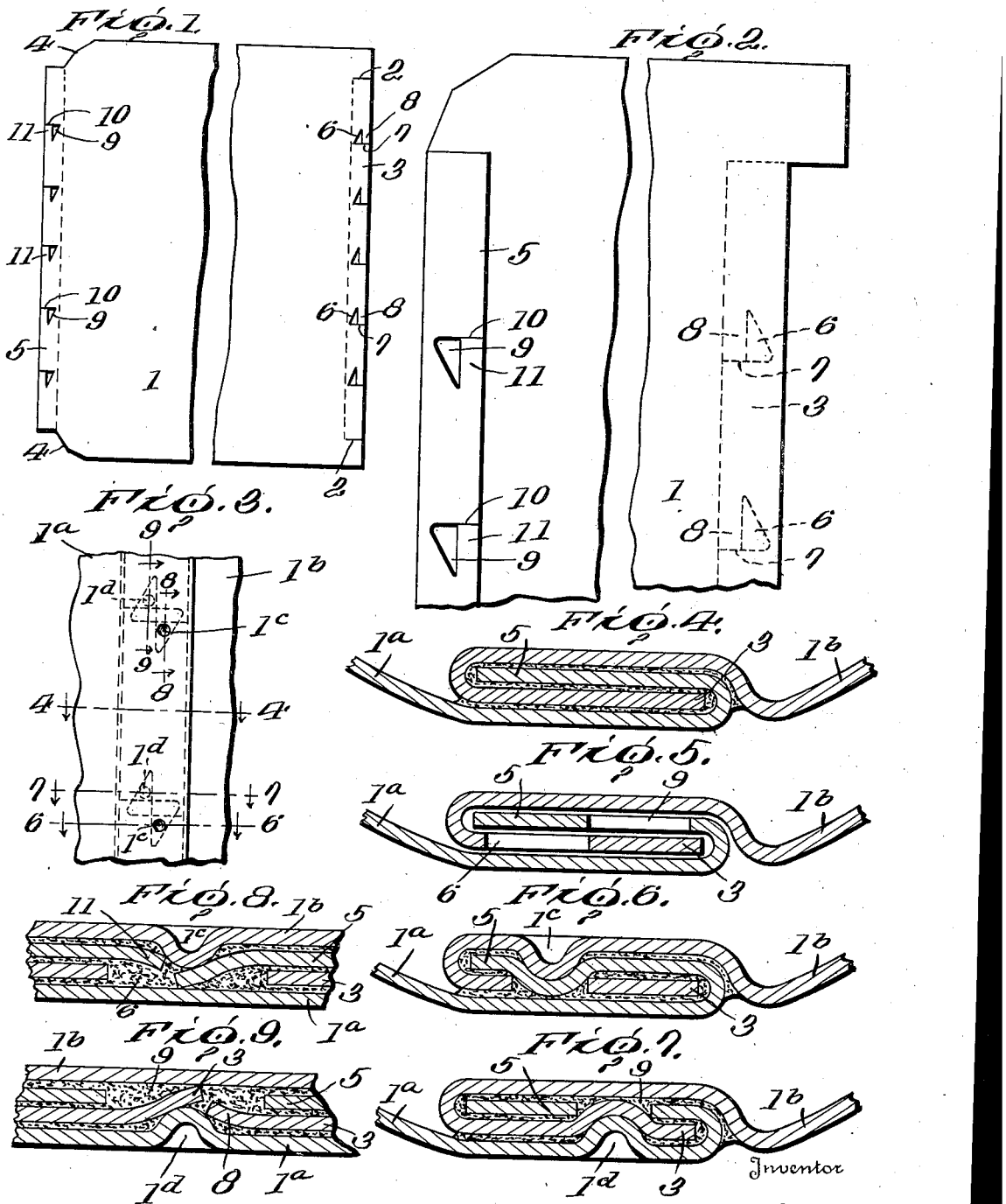

2,109,802

UNITED STATES PATENT OFFICE 2,109,802

SHEET METAL CAN BODY

Walter G. Plumb, Ridgewood, N. J., assignor to Continental Can Company, Inc., New York, N. Y., a corporation of New York Application July 21, 1937, Serial No. 154,922

3 Claims. (Cl. 220—76)

The invention relates to new and useful improvements in a sheet metal can body. It is a common practice in making can bodies from sheet metal to prepare the blank by shaping the ends thereof to provide hooks which are interlocked in the forming of a side seam. The hooks usually extend from one end of the can body to the other, terminating short of the end, where there are lap sections for facilitating the flanging of the can body. It is well known that when a can is subjected to excessive internal pressure, there is a tendency of the outer hook to hinge about the base of the inner hook, thus rupturing the solder bond. An object of the present invention is to provide a side seam having interlocking hooks wherein said hooks are so constructed that the inner hook is solder bonded to the body wall supporting the inner hook, and the outer hook is solder bonded to the body wall supporting the outer hook, so as to give strength to the side seam and resist the forces tending to rupture the solder bond.

A further object of the invention is to provide a side seam of the above type wherein the hooks are provided with lugs and recesses so arranged and disposed that the lugs of one hook can be forced into the recesses of the other hook to aid in the joining of the hooks to the body walls by the solder bond.

A still further object of the invention is to provide a side seam of the above type wherein the lugs are so disposed that the lugs in one hook contact with the sides of the lugs in the other hook so as to resist lateral strain on the seam.

These and other objects will in part be obvious and will in part be hereinafter more fully disclosed.

In the drawing—

Figure 1 is a plan view of a body blank embodying the invention;

Fig. 2 is an enlarged view of a portion of the body blank showing the metal bent to form the hooks;

Fig. 3 is a view from the inside of the can body of a portion of the side seam showing in broken lines the lugs and recesses;

Fig. 4 is a sectional view on the line 4—4 of Fig. 2;

Fig. 5 is a staggered sectional view through the side seam along the ends of the recesses showing the hooks interlocked, but before any deformation of the walls supporting the hooks;

Fig. 6 is a sectional view on the line 6—6 of Fig. 3; showing the finished solder bonded side seam construction;

Fig. 7 is a sectional view on the line 7—7 of Fig. 3;

Fig. 8 is a sectional view on the line 8—8 of Fig. 3, and

Fig. 9 is a sectional view on the line 9—9 of Fig. 3.

In carrying out the invention, a sheet of metal is cut so as to provide a body blank which is indicated at 1 in the drawing. This body blank constitutes the entire can body. The body blank is provided with slits 2, 2 this forming a portion which is later bent to form the hook 3. The hook 3 is shown as bent back on the body blank in Fig. 2 of the drawing. This hook 3 is the inner hook of the side seam. The blank is also notched as indicated at 4, 4 which offsets a portion that is later bent to form the hook 5 which is the outer hook of the side seam.

As shown in the drawing, the portion 1a of the body wall is the outer lapping portion thereof, and the hook 5 is integral with this outer lapping portion. 1b is the inner lapping portion of the body wall, and the hook 3 is formed integral therewith. The body blank is also cut so as to form recesses 6, 6. These recesses are preferably triangular, with one side of the triangle at right angles to the edge of the blank. The metal is also cut along the line 7, 7, thus forming lugs 8 extending lengthwise of the seam. Each lug has one end thereof free so that it can be bent laterally of the plane of the hook. The body blank 1 is also cut so as to provide recesses 9, 9, which are similarly disposed relative to the edge of the body blank forming the hook 5. The metal is also cut along lines 10, 10 and this forms lugs 11, 11 extending lengthwise of the seam and having free ends that can be bent laterally of the plane of the hook. The lugs 11 extend in the opposite direction from the lugs 8.

After the metal blank is cut in the manner above described, the hooks are bent back upon the body blank as shown in Fig. 2. The body blank is then curved into cylindrical form in the usual way, and the hooks interlocked and bumped. The bumping horn and spline are so shaped that the body walls 1a and 1b are deformed. A dimple 1c is formed in the wall 1b, which dimple is directly over the recess 6. The dimple contacts with the metal of the hook 5 adjacent the end of the tongue or lug 11 and forces the same down into the recess so that the space between the wall of the hook 5 and the wall 1a of the can body is such that the solder will flow by capillary attraction into the recess and solder bond the inner wall of the can body to the outer wall of the can body as clearly shown in Figures 8 and 9. Furthermore, the dimple 1c will force the end of the tongue or lug toward the wall 1a slightly, as shown in Figure 9. A dimple 1d is also formed in the body wall 1a, and this dimple will force the metal of the hook 3 into the recess 9 formed in the hook 5, as shown in Figure 7. The end of the lug 8 will likewise be forced nearer to the inner wall 1b of the can body, and here again, the solder will flow into the recess and firmly solder bond the outer wall to the inner wall of the can body. The lugs 8 and 11 are deflected so that the side edge of one is engaged by the side edge of the other under the pulling strain on the seam incident to external pressure on the container. It will be noted that the solder bond more efficiently ties the hooks together and the outer body wall to the inner body wall intermediate the width of the seam.

When the can is placed under excessive internal pressure, the outer hook tends to hinge about the base of the inner hook, thus rupturing the solder fillet 12a, and the rupturing of the solder bond then continues until the seam is broken down. Through this tying of the inner hook to the inner wall and the outer hook to the outer wall, there is a more direct bonding connection, which tends to resist this force which causes the outer hook to hinge about the base of the inner hook and rupture the solder bond. Furthermore, through this recessed construction of the hooks and the lugs, there is still a more direct solder bonding connection between the inner wall 1b and the outer wall, which greatly strengthens the side seam. Then again, the lugs overlapping and abutting, resist lateral strains on the seam due to this internal pressure tending to expand the can body to a larger diameter.

It is obvious that minor changes in the details of construction and the arrangement of the parts may be made without departing from the spirit of the invention as set forth in the appended claims.

Having thus described the invention, what I claim as new and desire to secure by Letters Patent, is—

1. A sheet metal can body having its edge portions joined in a side seam, said side seam including inner and outer interlocking hooks, each of said hooks being cut away at spaced intervals to form recesses back from the edge of the hook, said body wall having a dimple formed therein directly opposite the recess in the inner hook whereby the metal in the outer hook is forced into the recess in the inner hook so as to lie adjacent the body wall carrying the outer hook and said metal in the body wall having a dimple opposite the recess in the outer hook so that the metal in the inner hook is forced into the recess in the outer hook so as to lie adjacent the body wall carrying the inner hook to facilitate solder bonding.

2. A sheet metal can body having its edge portions joined in a side seam, said side seam including inner and outer interlocking hooks, each of said hooks being cut away at spaced intervals back from the edge of the hook so as to form a recess and a lug between each recess and the edge of the hook, said lugs extending lengthwise of the seam and having one end free, the lugs in one hook being oppositely disposed relative to the lugs in the other hook and arranged so that in the finished seam the ends of the lugs in one hook extend into the recesses in the other hook with adjacent side faces of the ends of the lugs in contact, and a solder bond uniting the hooks and securing the lugs of the inner hook to the inner body wall and the lugs of the outer hook to the outer body wall.

3. A sheet metal can body having its edge portions joined in a side seam, said side seam including inner and outer interlocking hooks, each of said hooks being cut away at spaced intervals back from the edge of the hook so as to form a recess and a lug between each recess and the edge of the hook, said lugs extending lengthwise of the seam and having one end free, said body wall having a dimple opposite each recess in the inner hook which forces the metal in the outer hook at the end of the lug and the lug into the recess in the inner hook so that it lies close to the wall of the can body carrying the outer hook, and said body wall having a dimple opposite each recess in the outer hook which forces the metal in the inner hook adjacent the end of the recess and the lug into the recess in the outer hook, so that it lies close to the wall of the can body carrying the inner hook to facilitate solder bonding.

WALTER G. PLUMB.